Patented Sept. 5, 1933

1,925,191

UNITED STATES PATENT OFFICE 1,925,191

OXIDATION PRODUCTS OF SULPHUR CONTAINING DERIVATIVES OF HIGHER PARAFFIN HYDROCARBONS AND PROCESS OF MAKING SAME

Karl Keller, Frankfort-on-the-Main-Fechenheim, Germany, assignor to General Aniline Works, Inc., New York, N. Y., a corporation of Delaware No Drawing. Application October 10, 1930, Serial No. 487,911, and in Germany February 25, 1930

12 Claims. (Cl. 260—17)

My present invention relates to new oxidation products of sulphur containing derivatives of higher paraffin hydrocarbons and process of making same.

In my copending application Serial No. 487,910 filed of even date, a process is described which comprises heating at temperatures ranging from 100 to 250° a derivative of technical mixtures representing liquid to solid paraffins containing more than 8 carbon atoms and at least one atomic grouping allowing the entrance of sulphur containing groups for example at least one double bond or at least two halogen atoms, which product preferably contains hydroxyl- or basic nitrogenous groups, with a sulphurizing agent selected from the group consisting of sulphur, hydrogen sulphide, hydrosulphides, sulphides and polysulphides.

The new products obtained according to the aforesaid process contain sulphur and they have a mercaptan or sulphide like character.

Now I have found that by treating these products with an oxidizing agent usual for converting this class of products into disulphides and sulphonic acids (cf. Methoden der organischen Chemie. Vol. II, (1922), page 162 to 164), such as concentrated or dilute nitric acid or hypochlorite solutions, permanganates, bichromates, chromic acid, hydrogen peroxide or Caro's acid new derivatives are obtained. It is a remarkable fact that only the groups containing sulphur are affected by the oxidizing agent whereas other groups and double bonds when present in the molecule remain unchanged. The oxidation process may be carried out with or without the addition of an organic solvent or diluent in an acid or alkaline medium at a low or high temperature.

The oxidation process generally takes place in two stages. The aforesaid initial products of mercaptan or sulphide character are generally at first converted into water insoluble products apparently of disulphide character, which products are then further oxidized by means of the same or another oxidizing agent with the formation of the corresponding sulphonic acids. In the case of starting from products containing several S- or SH-groups it is possible under certain conditions to convert only some of the said groups by partial oxidation into the sulphonic acid group, whereas others of the original S- or SH-groups remain as such or in the form of disulphides.

The present new oxidation products form light more or less viscous oils soluble in water according to the degree of oxidation in a molecular disperse or colloidal form, in many cases almost entirely colorless. They have always a strong acid character, those sulphonic acids being excepted which are obtained by oxidizing products containing in addition to groups containing sulphur also basic groups containing nitrogen which last mentioned products are obtainable for example by sulphurizing the reaction products of ammonia on halogenated higher paraffin. The sulphonic acids derived from these latter starting materials have a weaker acid and a more amphoteric character. They are scarcely soluble in water, insoluble in dilute acids but easily soluble in dilute alkalies. On acidifying the alkaline solution apparently an inner salt-like bond is formed between the sulphonic acid and basic group containing nitrogen.

The new products of oxidation may be used in the textile and pharmaceutical industries. Particularly the sulphonic acids are useful for all processes of finishing textile goods. They may be used either in an acid solution or in the form of their alkali salts in a neutral or alkaline solution. They are differentiated according to their degree of oxidation. The products which are only partially oxidized for example have a good emulsifying power, the entirely oxidized products particularly show a remarkable protective power towards water-insoluble metal salts and metal soaps.

In order to further illustrate my invention the following examples are given, the parts being by weight and all temperatures in centigrade degrees. But I wish it to be understood that I am not limited to the particular conditions nor specific products mentioned therein.

Example 1

19 parts of the product obtained according to Example 2 of my copending application by heating trichlorinated paraffin with an alcoholic solution of potassium sulphide and which product contains about two SH-groups in its molecule are dissolved in 80 parts of carbon tetrachloride; into this solution while well stirring at 40–50°, 11 parts of concentrated nitric acid are slowly introduced. On adding the first portion of nitric acid a yellowish, water insoluble and voluminous product of a disulphide character is obtained which by adding further portions of the oxidant is converted into the corresponding sulphonic acid. When the evolution of nitrogen oxide has ceased the carbon tetrachloride is removed from the sulphonic acid separated as a light thin oil and the product is freed from some adhering solvent by warming it for a short time in vacuo. The new product thus obtained forms a weakly yellowish colored product of a sirupy consistency. It forms a clear aqueous solution of a strong acid reaction and of unsaturated character. On neutralizing the acid aqueous solution with alkalies and salting out the solution, the alkali salts are obtained as yellowish viscous oils. The aqueous solution of the salts show for instance a remarkable protective power towards various water-insoluble salts, particularly towards metal soaps.

Instead of carbon tetrachloride likewise other diluents such as trichloroethylene, or petroleum ether may be used. But the oxidation can be carried out with the same good result without the addition of any organic diluent by using for instance directly concentrated or dilute aqueous nitric acid when otherwise modifying the reaction conditions accordingly.

When replacing the aforesaid initial product by 21 parts of a mercapto compound containing besides double bonds about 3 mercapto group in its molecule obtainable for instance by the action of an alcoholic potassium hydrosulphide solution on hexachlorinated hard paraffin and when oxidizing this product with only 6.6 parts of concentrated nitric acid, i. e. a quantity which is insufficient for entirely transforming the mercapto groups into the corresponding sulphonic acid group, a new product is obtained which is likewise soluble in water but which contains according to analysis only a part of the sulphonic acid groups, which are theoretically possible. Apparently a part of the sulphur containing groups remains unchanged. Also this new product has an unsaturated character and may be used in a like manner as the product of paragraph 1. It surpasses this latter product by an increased emulsifying effect.

When starting from products obtained by sulphurization of unsaturated paraffin derivatives containing hydroxyl- or nitrogenous groups and sulphur in form of sulphide groups by a corresponding oxidation process likewise new sulphonic acid compounds of similar properties are formed.

Example 2

45 parts of the product obtained by heating in an autoclave at about 120–130° heptachlorinated soft paraffin with a methylalcoholic solution of sodium hydrosulphide and which product contains about 3 mercapto groups in its molecule are suspended in about 300 parts of water. After addition of about 40 parts of a caustic soda solution 33° Bé. 70 parts of a hydrogen peroxide solution of 30% strength are allowed to run in slowly at about 70–80° while stirring, the temperature of the reaction mass being slowly increased to about 95°. After some hours the corresponding disulphide compound which has been formed, separates. It is filtered off and washed out with water. It represents a white elastic substance insoluble in most of the usual solvents. According to the statement of Example 1 it may be subjected to a further oxidation for instance with nitric acid, with potassium permanganate in an alcoholic solution, or with Caro's acid with the formation of the corresponding trivalent sulphonic acid or, when using only such a quantity of oxidizing agent, which is insufficient for a complete oxidation, with the formation of a compound containing only about 2 sulphonic acid groups and about 1 disulphide group.

Example 3

30 parts of the product obtained by heating in an autoclave at about 200–210° pentachlorinated paraffin oil with an aqueous alcoholic solution of sodium tetrasulphide, and which product is unsaturated and contains chlorine and sulphur, are mixed with about 60 parts of water and the suspension is heated while stirring at about 100°. While well stirring at about 90–100° about 1500 parts of a sodium hypochlorite solution containing about 7% of active chlorine are slowly added. After some hours the initial product has been converted into the water soluble sodium salt of the corresponding sulphonic acid. The solution thus formed is separated from certain insoluble impurities by filtration. The filtrate is evaporated to the desired degree of concentration and the free acid is isolated therefrom by adding concentrated hydrochloric acid. The new compound represents an entirely colorless viscous oil. It contains the sulphonic acid groups corresponding to the sulphur containing groups of the starting material and the chlorine atoms and double bonds of the initial product. The sodium salt can be isolated as a weakly yellowish oil by adding common salt to the evaporated alkaline solution.

Example 4

The starting material for the process described hereinafter has been prepared as follows:

If heptachlorinated hard paraffin is heated in an autoclave at about 190–200° with an aqueous potassium carbonate solution, it is converted into a weakly unsaturated and hydroxylated product which still contains about 4 chlorine atoms in its molecule. This conversion product is then heated in an autoclave at about 145–150° with an alcoholic solution of sodium sulphide, whereby a hydroxylated and unsaturated product is obtained which is free from chlorine and contains about 2 SH-groups in its molecule.

42 parts of this latter product are suspended in a solution of 4 parts of caustic soda in about 50 parts of water. Then the mixture is warmed to about 40–50° and at this temperature while well stirring a solution of 57 parts of potassium permanganate in about 500 parts of water is slowly added in accordance with the degree of decolorization of the permanganate solution. The reaction is finished when all starting material has been dissolved. The separted sludge containing manganese dioxide is removed by filtration and the filtrate is somewhat evaporated. The concentrated solution thus obtained may be immediately used for technical purposes. From this solution the free acid or its sodium salt may be isolated as described above. The new compound is shown by analysis to be hydroxylated, and to contain about two sulfonic acid groups.

Example 5

Hexachlorinated hard paraffin is heated in an autoclave at about 140–150° with a methyl alcoholic solution of ammonia, whereby an oil is obtained, consisting substantially of a base containing about two basic nitrogenous groups, one double bond and two chlorine atoms in its molecule. This product is then heated in an autoclave at about 130–140° with an alcoholic solution of potassium sulphide. The reaction product is unsaturated and contains besides the basic nitrogenous groups about one SH-group in its molecule.

21 parts of this latter product are mixed with about 50 parts of carbon tetrachloride and while well stirring at about 50–60° 6.5 parts of concentrated nitric acid are slowly added whereby the reaction product separates as a yellowish oil. When the evolution of nitrogen oxides ceases, the formed oil is separated from the carbon tetrachloride and is shortly dried in vacuo. In this manner a yellowish semisolid product is obtained, which is slightly soluble in water, insoluble in dilute acids and easily soluble in dilute alkali solutions. According to analysis the new compound contains about one sulphonic acid group and the basic nitrogenous groups of the starting material. Probably the compound represents an inner salt. By adding common salt to its alkaline solutions the sodium salt may be separated as a yellowish viscous oil. The product shows properties similar to the products of the foregoing examples.

When subjecting a product obtained by heating the initial product described in the beginning of this example in an autoclave at about 130–140° with a solution of sodium tetrasulphide in cyclohexanol, which product contains besides the basic nitrogenous groups nearly 3 sulphur atoms in its molecule, to the same oxidation process a similar product is obtained.

Example 6

Trichlorinated hard paraffin is heated with a caustic soda solution and the hydroxylated reaction product which still contains about 1 chlorine atom is heated in an autoclave at about 140–150° with an alcoholic sodium sulphide solution whereby a product is formed, which is free from chlorine and contains about 1 sulphur atom in its molecule.

9 parts of this product are suspended in about 25 parts of water and at about 95–100° into this suspension a mixture of 8.5 parts of concentrated sulphuric acid with 10 parts of a hydrogen peroxide solution of 33% strength is slowly added. At first the white water-insoluble disulphide compound is formed which by the further oxidation process slowly becomes thinly liquid and after some hours is entirely transformed into the sulphonic acid compound. The latter compound, separating as an oil, is removed from the acid solution and dried if necessary. In this manner an almost colorless salvy product is obtained which is easily soluble in water. Its sodium salt shows properties similar to the above described sodium salts.

With the same success the sulphurization products of the unsaturated and hydroxylated conversion products of chlorinated paraffin can be subjected to the aforesaid oxidation process.

Generally speaking in all of the foregoing examples as starting material the products can be used which are obtained by adding sulphur containing groups to the double bonds of unsaturated higher olefine hydrocarbons or of their derivatives containing hydroxyl- or basic nitrogenous groups. But probably in the oxidization products obtained therefrom the disulphide and sulphonic acid groups are found in other positions of the molecule than in the corresponding products described in the foregoing examples.

I claim:—

1. A process for producing new derivatives of higher paraffin hydrocarbons which process comprises treating with an oxidizing agent usual for converting mercapto compounds into disulphides and sulphonic acids, said sulphur containing derivatives of paraffin hydrocarbons obtained by sulphuration of derivatives of a techanical mixture of paraffin hydrocarbons, said hydrocarbon derivatives containing more than 8 carbon atoms and at least one atomic grouping allowing the entrance of sulphur containing groups.

2. A process for producing new derivatives of higher paraffin hydrocarbons which process comprises treating with an oxidizing agent usual for converting mercapto compounds into disulphides and sulphonic acids, said sulphur containing derivatives of paraffin hydrocarbons obtained by sulphurization of derivatives of a technical mixture of paraffin hydrocarbons, said hydrocarbon derivatives containing more than 8 carbon atoms and at least one double bond.

3. A process for producing new derivatives of higher paraffin hydrocarbons which process comprises treating with an oxidizing agent usual for converting mercapto compounds into disulphides and sulphonic acids, said sulphur containing derivatives of paraffin hydrocarbons obtained by sulphurization of derivatives of a technical mixture of paraffin hydrocarbons, said hydrocarbon derivatives containing more than 8 carbon atoms and at least two halogen atoms.

4. A process for producing new derivatives of higher paraffin hydrocarbons which process comprises treating with an oxidizing agent usual for converting mercapto compounds into disulphides and sulphonic acids, said sulphur containing derivatives of paraffin hydrocarbons obtained by sulphurization of polyhalogenated derivatives of a technical mixture of paraffin hydrocarbons said hydrocarbon derivatives containing more than 8 carbon atoms.

5. As new compounds the oxidation products of sulphur containing derivatives of a technical mixture of liquid to solid paraffin hydrocarbons, said product being light more or less viscous oils soluble in water according to the degree of oxidation in a molecular disperse or colloidal form, most of which have a strong acid character, said products being obtained by treating with an oxidizing agent usual for converting mercapto compounds into disulphides and sulphonic acids, said sulphur containing derivatives of paraffin hydrocarbons obtained by sulphurization of derivatives of paraffin hydrocarbons said hydrocarbon derivatives containing more than 8 carbon atoms and at least one atomic grouping allowing the entrance of sulphur containing groups.

6. As new compounds the oxidation products of sulphur containing derivatives of a technical mixture of liquid to solid paraffin hydrocarbons, said products being light more or less viscous oils soluble in water according to the degree of oxidation in a molecular disperse or colloidal form, most of which have a strong acid character, said products being obtained by treating with an oxidizing agent usual for converting mercapto compounds into disulphides and sulphonic acids, said sulphur containing derivatives of paraffin hydrocarbons obtained by sulphurization of derivatives of paraffin hydrocarbons said hydrocarbon derivatives containing more than 8 carbon atoms and at least one double bond.

7. As new compounds the oxidation products of sulphur containing derivatives of a technical mixture of liquid to solid paraffin hydrocarbons, said products being light more or less viscous oils soluble in water according to the degree of oxidation in a molecular disperse or colloidal form, most of which have a strong acid character, said products being obtained by treating with an oxidizing agent usual for converting mercapto compounds into disulphides and sulphonic acids, said sulphur containing derivatives of paraffin hydrocarbons obtained by sulphurization of derivatives of paraffin hydrocarbons said hydrocarbon derivatives containing more than 8 carbon atoms and at least two halogen atoms.

8. As new compounds the oxidation products of sulphur containing derivatives of a technical mixture of liquid to solid paraffin hydrocarbons, said products being light more or less viscous oils soluble in water according to the degree of oxidation in a molecular disperse or colloidal form, most of which have a strong acid character, said products being obtained by treating with an oxidizing agent usual for converting mercapto compounds into disulphides and sulphonic acids, said sulphur containing derivatives of paraffin hydrocarbons obtained by sulphurization of polyhalogenated derivatives of paraffin hydrocarbons said hydrocarbon derivatives containing more than 8 carbon atoms.

9. A process for producing new derivatives of higher paraffin hydrocarbons, which comprises treating, with an oxidizing agent usual for converting mercapto compounds into disulphides and sulphonic acids, sulphur containing derivatives of a technical mixture of paraffin hydrocarbons obtained by sulphurization of derivatives of said paraffin hydrocarbons said hydrocarbon derivatives containing more than 8 carbon atoms, at least one atomic grouping allowing the entrance of sulphur containing groups and a substituent selected from the group consisting of hydroxyl groups and basic nitrogen-containing groups.

10. A process for producing new derivatives of higher paraffin hydrocarbons, which comprises treating, with an oxidizing agent usual for converting mercapto compounds into disulphides and sulphonic acids, sulphur containing derivatives of a technical mixture of paraffin hydrocarbons obtained by sulphurization of derivatives of said paraffin hydrocarbons said hydrocarbon derivatives containing more than 8 carbon atoms, at least one double bond and a substituent selected from the group consisting of hydroxyl groups and basic nitrogen-containing groups.

11. A process for producing new derivatives of higher paraffin hydrocarbons, which comprises treating, with an oxidizing agent usual for converting mercapto compounds into disulphides and sulphonic acids, sulphur containing derivatives of a technical mixture of paraffin hydrocarbons obtained by sulphurization of derivatives of said paraffin hydrocarbons said hydrocarbon derivatives containing more than 8 carbon atoms, at least 2 halogen atoms and a substituent selected from the group consisting of hydroxyl groups and basic nitrogen-containing groups.

12. As new compounds the products obtained by treating, with an oxidizing agent usual for converting mercapto compounds into disulphides and sulphonic acids, the sulphur containing derivatives of a technical mixture of paraffin hydrocarbons said hydrocarbon derivatives containing at least 8 carbon atoms and at least one substituent selected from the group consisting of hydroxyl groups and basic nitrogen-containing groups, said products being light oils.

KARL KELLER.